United States Patent
Kim

(10) Patent No.: US 12,164,788 B2
(45) Date of Patent: Dec. 10, 2024

(54) SYSTEM ON CHIP AND OPERATION METHOD THEREOF

(71) Applicant: SAMSUNG ELECTRONICS CO., LTD., Suwon-si (KR)

(72) Inventor: Moongyung Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 181 days.

(21) Appl. No.: 17/987,551

(22) Filed: Nov. 15, 2022

(65) Prior Publication Data

US 2023/0152990 A1     May 18, 2023

(30) Foreign Application Priority Data

Nov. 15, 2021   (KR) .................. 10-2021-0157091
Mar. 2, 2022    (KR) .................. 10-2022-0026911

(51) Int. Cl.
G06F 3/06     (2006.01)

(52) U.S. Cl.
CPC .......... *G06F 3/0625* (2013.01); *G06F 3/0629* (2013.01); *G06F 3/0683* (2013.01)

(58) Field of Classification Search
CPC ..... G06F 3/0625; G06F 3/0629; G06F 3/0683
See application file for complete search history.

(56) References Cited

U.S. PATENT DOCUMENTS

| | | | |
|---|---|---|---|
| 8,938,417 B2 | 1/2015 | Haustein et al. | |
| 9,143,441 B2 | 9/2015 | Basso et al. | |
| 9,256,531 B2 | 2/2016 | Cho | |
| 9,612,648 B2 | 4/2017 | Chun et al. | |
| 9,680,652 B2 | 6/2017 | Parra et al. | |
| 10,866,906 B2 | 12/2020 | Ha et al. | |
| 11,030,714 B2 | 6/2021 | Das | |
| 2010/0058027 A1* | 3/2010 | Gong | H04L 45/54 711/216 |
| 2020/0285590 A1 | 9/2020 | Choi | |

FOREIGN PATENT DOCUMENTS

KR   10-2017-0122481 A   11/2017

* cited by examiner

*Primary Examiner* — Jae U Yu
(74) *Attorney, Agent, or Firm* — Sughrue Mion, PLLC

(57) ABSTRACT

A system on chip is provided. The system on chip includes: a plurality of memory controllers respectively connected to a plurality of memory devices; a plurality of logic circuits, each logic circuit being configured to perform a data processing operation using at least one of the plurality of memory controllers; and a bus connection interface configured to select a first hash function from among a plurality of hash functions based on a first address region corresponding to first addresses received from a first logic circuit from among the plurality of logic circuits, obtain hashed first addresses by applying the first hash function to the first addresses, and connect at least one of the plurality of memory controllers to the first logic circuit using a first access method that corresponds to the hashed first addresses.

20 Claims, 17 Drawing Sheets

SYSTEM ON CHIP AND OPERATION METHOD THEREOF

CROSS-REFERENCE TO RELATED APPLICATIONS

This application is based on and claims priority under 35 U.S.C. § 119 to Korean Patent Application Nos. 10-2021-0157091 and 10-2022-0026911, filed on Nov. 15, 2021 and Mar. 2, 2022, respectively, in the Korean Intellectual Property Office, the disclosures of which are incorporated by reference herein in their entireties.

BACKGROUND

The present disclosure relates to a system on chip (SoC), and more particularly, to an SoC including a plurality of intellectual properties (IPs) and supporting access of the plurality of IPs to a plurality of memory devices, and an operation method thereof. Each of the plurality of IPs may include circuitry to perform specific functions, and may have a design that includes a trade secret.

As computers, communication, broadcasting, etc., are gradually integrated, demand for Application Specific Integrated Circuit (ASIC) technology and Application Specific Standard Product (ASSP) technology is decreasing and demand for SoC technology is increasing. In addition, increasing demand for lightweight, compact and high functional information technology (IT) devices is also a factor in increasing demand for SoC technology.

SoC is a form in which functional blocks having various functions, for example, IPs, are implemented on a single chip according to the development of semiconductor process technology. IPs need access to a plurality of memory devices connected to the SoC in order to perform data processing operations.

The SoC may support access of IPs to a plurality of memory devices by using a single hash function, but this does not reflect the data access characteristic of each IP, which causes unnecessary power consumption and inefficient memory access.

SUMMARY

One or more example embodiments provide a system on chip (SoC) configured to minimize unnecessary power consumption by supporting access of a plurality of intellectual properties (IPs) to a plurality of memory devices by using a plurality of hash functions and to enable efficient memory access, and an operation method thereof.

According to an aspect of an example embodiment, a system on chip includes: a plurality of memory controllers respectively connected to a plurality of memory devices; a plurality of logic circuits, each logic circuit of the plurality of logic circuits being configured to perform a data processing operation using at least one of the plurality of memory controllers; and a bus connection interface configured to select a first hash function from among a plurality of hash functions based on a first address region corresponding to first addresses received from a first logic circuit from among the plurality of logic circuits, obtain hashed first addresses by applying the first hash function to the first addresses, and connect at least one of the plurality of memory controllers to the first logic circuit using a first access method that corresponds to the hashed first addresses.

According to an aspect of an example embodiment, an operation method of a system on chip includes: identifying an address region corresponding to addresses output from a logic circuit from among a plurality of address regions; selecting a hash function corresponding to the address region from among a plurality of hash functions; applying the hash function to the addresses to obtain hashed addresses; and connecting the logic circuit to at least one of a plurality of memory controllers using an access method that corresponds to the hashed addresses.

According to an aspect of an example embodiment, a system on chip includes: a plurality of memory controllers respectively connected to a plurality of memory devices; a plurality of bus connection interfaces respectively connected to the plurality of memory controllers; and a first logic circuit configured to select any one of a plurality of first hash functions based on a first address region corresponding to first addresses, apply the selected first hash function to the first addresses to obtain hashed first addresses, and connect to at least one of the plurality of bus connection interfaces using a first access method corresponding to the hashed first addresses.

BRIEF DESCRIPTION OF THE DRAWINGS

The above and other aspects and features will be more clearly understood from the following description of example embodiments taken in conjunction with the accompanying drawings, in which.

DETAILED DESCRIPTION

Example embodiments will be described more fully hereinafter with reference to the accompanying drawings.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
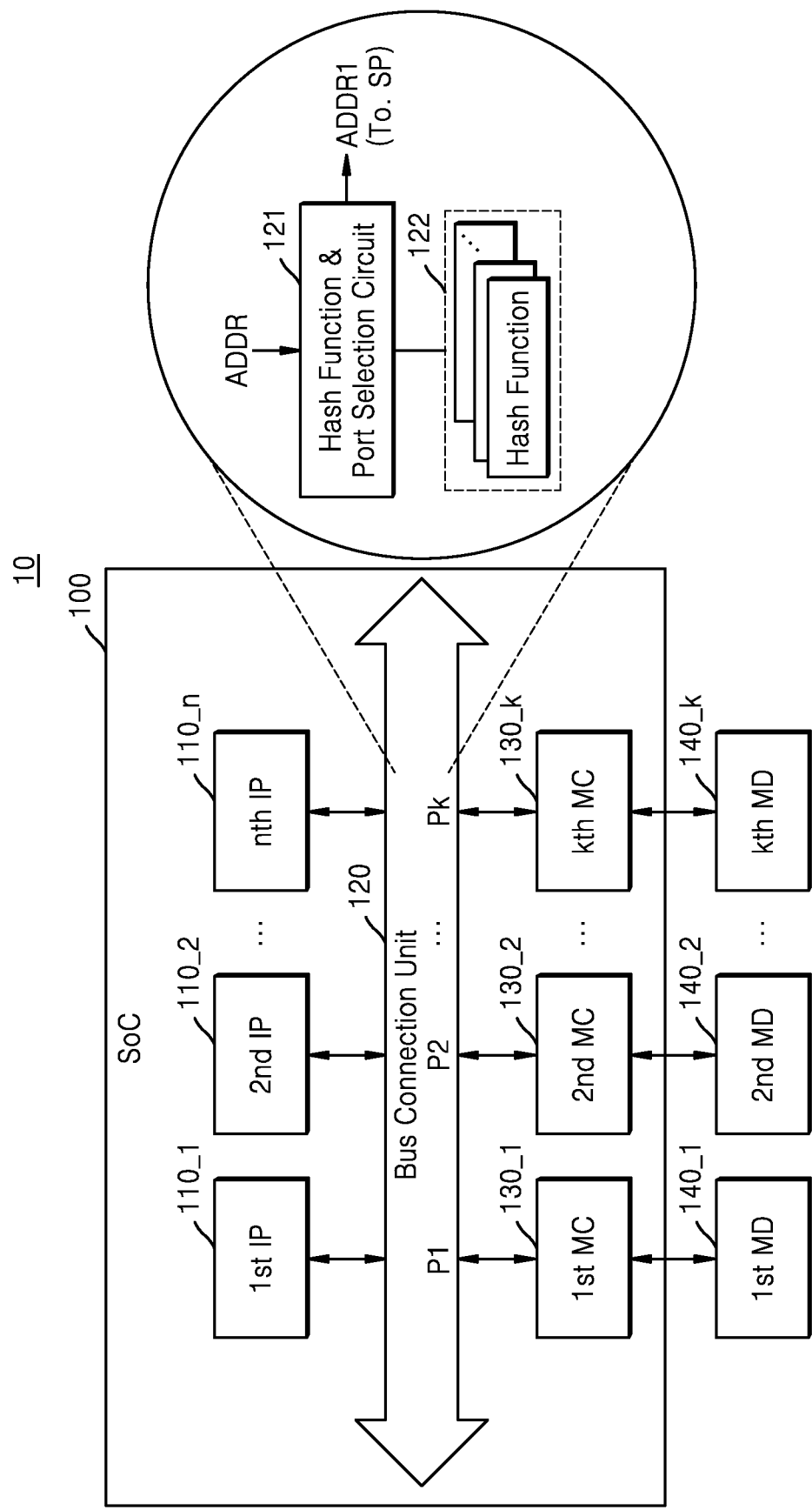
FIG. 1 is a block diagram schematically illustrating a memory system according to an example embodiment.

FIG. 1 is a block diagram schematically illustrating a memory system 10 according to an example embodiment.

Referring to FIG. 1, the memory system 10 may include a system on chip (SoC) 100 and first to k-th memory devices (MDs) 140_1 to 140_k (where k is an integer greater than or equal to 1). In addition, the SoC 100 may include first to n-th intellectual properties (IPs) 110_1 to 110_n (where n is an integer greater than or equal to 1), a bus connection unit (BCU) 120 (i.e., a bus or a bus connection interface), and first to k-th memory controllers 130_1 to 130_k. For example, an IP may be a logic circuit that includes circuitry to perform specific functions, and may have a design that includes a trade secret.

In an example embodiment, the first to k-th MDs 140_1 to 140_k may be implemented as volatile memory devices. For example, the first to k-th MDs 140_1 to 140_k may be implemented as any one of dynamic random access memory (DRAM), synchronous DRAM (SDRAM), double data rate SDRAM (DDR SDRAM), low power double data rate SDRAM (LPDDR SDRAM), graphics double data rate SDRAM (GDDR SDRAM), DDR2 SDRAM, DDR3 SDRAM, and DDR4 SDRAM. Furthermore, the first to k-th MDs 140_1 to 140_k may also be implemented as nonvolatile memory devices.

In an example embodiment, the first to n-th IPs 110_1 to 110_n may include any one or any combination of a central processing unit (CPU), a graphics processing unit (GPU), a neural processing unit (NPU), a vision processing unit (VPU), a digital signal processor (DSP), and an image signal processor (ISP). However, this is an example, and example embodiments are not limited thereto. For example, the first to n-th IPs 110_1 to 110_n may be functional blocks designed for a specific operation of the SoC 100 or functional blocks designed to improve the performance of the SoC 100.

Each of the first to n-th IPs 110_1 to 110_n may perform a data processing operation, and memory access for writing data and reading data may be required for the data processing operation. Accordingly, in example embodiments, the BCU 120 may support connections between the first to n-th IPs 110_1 to 110_n and the first to k-th memory controllers 130_1 to 130_k. In addition, the first to n-th IPs 110_1 to 110_n may perform data processing operations independently of each other, and the BCU 120 may control connections between the first to n-th IPs 110_1 to 110_n and the first to k-th memory controllers 130_1 to 130_k in parallel or sequentially.

In an example embodiment, the BCU 120 may include first to k-th ports P1 to Pk, a hash function & port selection circuit 121, and a plurality of hash functions 122. The first to k-th ports P1 to Pk may be respectively connected to the first to k-th memory controllers 130_1 to 130_k. In an example embodiment, the hash function & port selection circuit 121 may be implemented as hardware or software executed by a processing circuit. Also, the plurality of hash functions 122 may be stored in one or more nonvolatile memories included in the SoC 100 and read by the hash function & port selection circuit 121. In some example embodiments, the plurality of hash functions 122 may be designed in advance and stored in the non-volatile memory, and the plurality of hash functions 122 may be changeable.

The plurality of hash functions 122 may be functions for converting addresses output from the first to n-th IPs 110_1 to 110_n into data of a fixed length. In an example embodiment, the plurality of hash functions 122 may respectively correspond to a plurality of address regions. For example, a first hash function may correspond to a first address region, and a second hash function may correspond to a second address region. Also, in an example embodiment, the plurality of hash functions 122 may be designed so that access methods respectively corresponding to the plurality of hash functions 122 are different from each other. In some example embodiments, newly designed hash functions may be added to the plurality of hash functions 122 or some of the plurality of hash functions 122 may be modified according to states of the first to n-th IPs 110_1 to 110_n and states of the first to k-th memory controllers 130_1 to 130_k. In the present disclosure, the access method indicates a method in which the first to n-th IPs 110_1 to 110_n access the first to k-th MDs 140_1 to 140_k, and may be determined according to an accessed MD among the first to k-th MDs 140_1 to 140_k and whether an interleaving access method is supported. Also, in the present disclosure, the first to n-th IPs 110_1 to 110_n accessing the first to k-th MDs 140_1 to 140_k may indicate the first to n-th IPs 110_1 to 110_n accessing the first to k-th memory controllers 130_1 to 130_k.

Hereinafter, a case in which the first IP 110_1 outputs first addresses ADDR1 for the data processing operation is assumed to help understanding of example embodiments, and it will be understood that similar data processing operations may be applied to the remaining IPs (i.e., the second to n-th IPs 110_2 to 110_n).

In an example embodiment, the hash function & port selection circuit 121 may receive the first addresses ADDR1 output from the first IP 110_1, and it may determine to which of the plurality of address regions the first addresses ADDR1 belong. In the present disclosure, the address region may indicate a range of value of an address. Some of the plurality of address regions may have the same size. For example, a first address region may be set to a value '1' to '1000' and a second address region may be set to a value '1001' to '2000', and in this regard the first address region and the second address region may have the same size. In some example embodiments, some of the plurality of address regions may have different sizes. For example, the first address region may be set to a value '1' to '1000' and the second address region may be set to a value '1001' to '5000', and in this regard the first address region and the second address region may have different sizes.

The hash function & port selection circuit 121 may select, from among the plurality of hash functions 122, a hash function corresponding to an address region to which the first addresses ADDR1 belong. The hash function & port selection circuit 121 may apply the selected hash function to the first addresses ADDR1 to generate hashed first addresses, and based on the hashed first addresses, may select at least one of the first to k-th ports P1 to Pk. For example, the hash function & port selection circuit 121 may operate according to an interleaving access method, and may alternately select at least two of the first to k-th ports P1 to Pk based on the hashed first addresses. As another example, the hash function & port selection circuit 121 may operate according to a sequential access method, and may sequentially select at least one of the first to k-th ports P1 to Pk based on the hashed first addresses. The hash function & port selection circuit 121 may output the first addresses ADDR1 to at least one selected port SP. In the present disclosure, an operation of selecting the first to k-th ports P1 to Pk may indicate, and may be referred to as, an operation of selecting the first to k-th memory controllers 130_1 to 130_k.

In an example embodiment, each of the first to k-th memory controllers 130_1 to 130_k may control a memory operation of a memory device connected thereto among the first to k-th MDs 140_1 to 140_k by using any one of addresses from the first to n-th IPs 110_1 to 110_n transmitted from the BCU 120. For example, the memory operation may include at least one of a write operation and a read operation, and during the write operation, the BCU 120 may further receive data along with addresses. Also, the BCU 120 may further receive a request for the memory operation from at least one of the first to n-th IPs 140_1 to 140_k. The BCU 120 may output the data and the request to match outputs with respect to the addresses according to example embodiments. In an example embodiment, formats of addresses output from the first to n-th IPs 110_1 to 110_n may be the same as formats of physical addresses of the first to k-th MDs 140_1 to 140_k.

In an example embodiment, the first to n-th IPs 110_1 to 110_n may be classified into a plurality of IP groups, and each of the plurality of IP groups may include IPs having the same or similar data access characteristics. In the present disclosure, the data access characteristic considers an operation method in the data processing operation of the first to n-th IPs 110_1 to 110_n or an operation mode of the first to n-th IPs 110_1 to 110_n, and may relate to required memory capacity, required data read/write speed, etc. In an example embodiment, the number of hash functions applicable to each of the plurality of IP groups and a combination of hash functions may be different. For example, all of the plurality of hash functions 122 may be applied to a first IP group, and at least one specific hash function (i.e., fewer than all of the plurality of hash functions 122) among the plurality of hash functions 122 may be applied to a second IP group.

In an example embodiment, a main IP may classify the first to n-th IPs 110_1 to 110_n into the plurality of IP groups by mapping at least one of the plurality of hash functions 122 to each of the first to n-th IPs 110_1 to 110_n. In some example embodiments, the main IP may generate and manage hash function mapping information indicating mapping relationships between the first to n-th IPs 110_1 to 110_n and the plurality of hash functions 122. In some example embodiments, the main IP may be one of the first to n-th IPs 110_1 to 110_n. The main IP may execute an operating system of the SoC 100, and perform a general operation for classifying the plurality of address regions and applying the plurality of hash functions 122. In an example embodiment, the main IP may be implemented as a CPU.

In an example embodiment, the SoC 100 may further include a power management integrated circuit. The power management integrated circuit may perform power management on the first to k-th memory controllers 130_1 to 130_k based on hash function mapping information. A specific example embodiment thereof is described with reference to FIGS. 8 and 10B.

The SoC 100 according to example embodiments may select the access method suitable for the data processing operation of each of the first to n-th IPs 110_1 to 110_n by using the plurality of hash functions 122, and thus, unnecessary power consumption of the SoC 100 may be minimized and the performance of the SoC 100 may improve.

Figure 2:
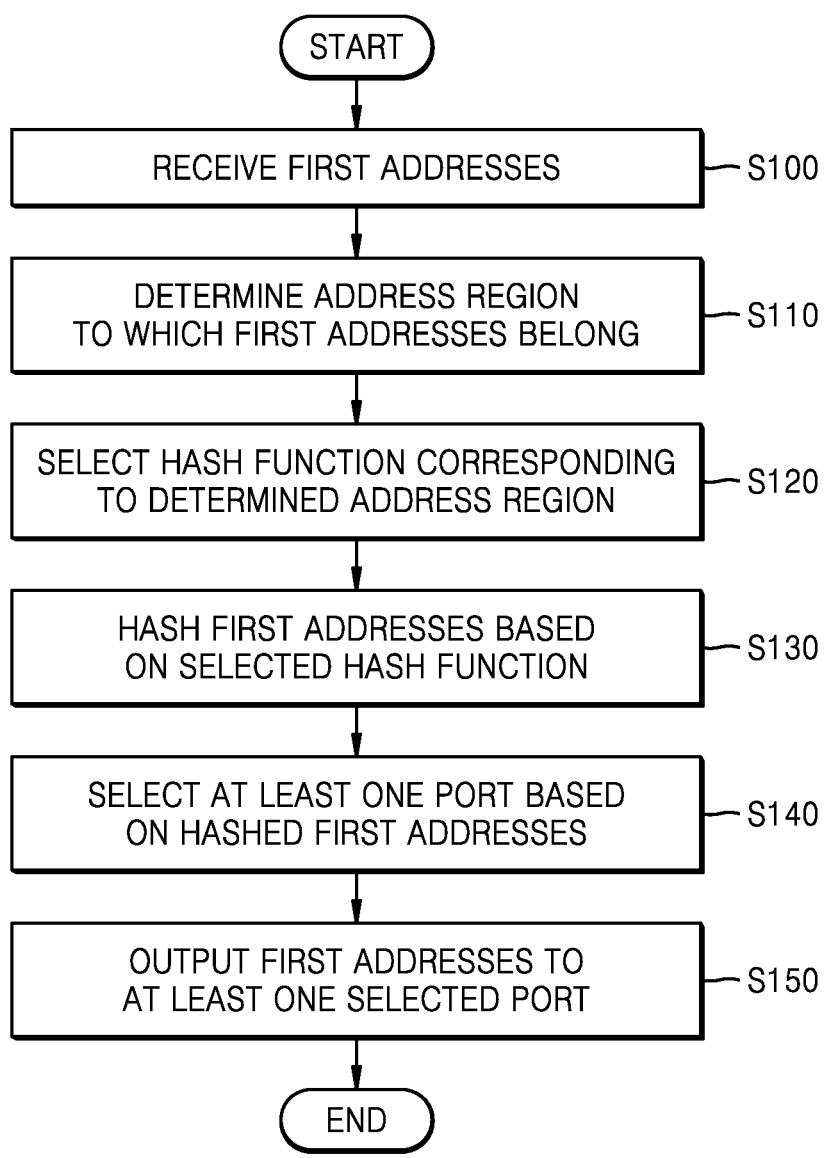
FIG. 2 is a flowchart illustrating a method of operating a system on chip (SoC), according to an example embodiment.

FIG. 2 is a flowchart illustrating a method of operating an SoC, according to an example embodiment. Referring to FIG. 2, an operation of the BCU 120 of the SoC is mainly described, and FIG. 1 is further referred to for better understanding. Hereinafter, an example in which the first addresses ADDR1 (FIG. 1) output from the first IP 110_1 (FIG. 1) will be mainly described. However, example embodiments are not limited thereto and similar operations may be performed by the BCU 120 according to other addresses output from other IPs.

Referring to FIGS. 1 and 2, in operation S100, the BCU 120 may receive the first addresses ADDR1 from the first IP 110_1. In operation S110, the BCU 120 may determine an address region to which the first addresses ADDR1 belong. Specifically, the BCU 120 may search for an address region including values of the first addresses ADDR1. In operation S120, the BCU 120 may select a hash function corresponding to the determined address region from among the plurality of hash functions 122. In some example embodiments, the BCU 120 may select two or more hash functions when the first addresses ADDR1 belong to two or more address regions. In operation S130, the BCU 120 may hash the first addresses ADDR1 based on the selected hash function. In operation S140, the BCU 120 may select at least one port from among the first to k-th ports P1 to Pk based on the hashed first addresses ADDR1. In operation S150, the BCU 120 may output the first addresses ADDR1 to the selected at least one port SP. In some example embodiments, the BCU 120 may output the first addresses ADDR1 to the selected at least one port SP without performing additional processing. In another example embodiment, the BCU 120 may process the first addresses ADDR1 according to the selected hash function, and then output the processed first addresses ADDR1 to the selected at least one port SP. A specific description thereof is given with reference to FIG. 3B.

Figure 3A:
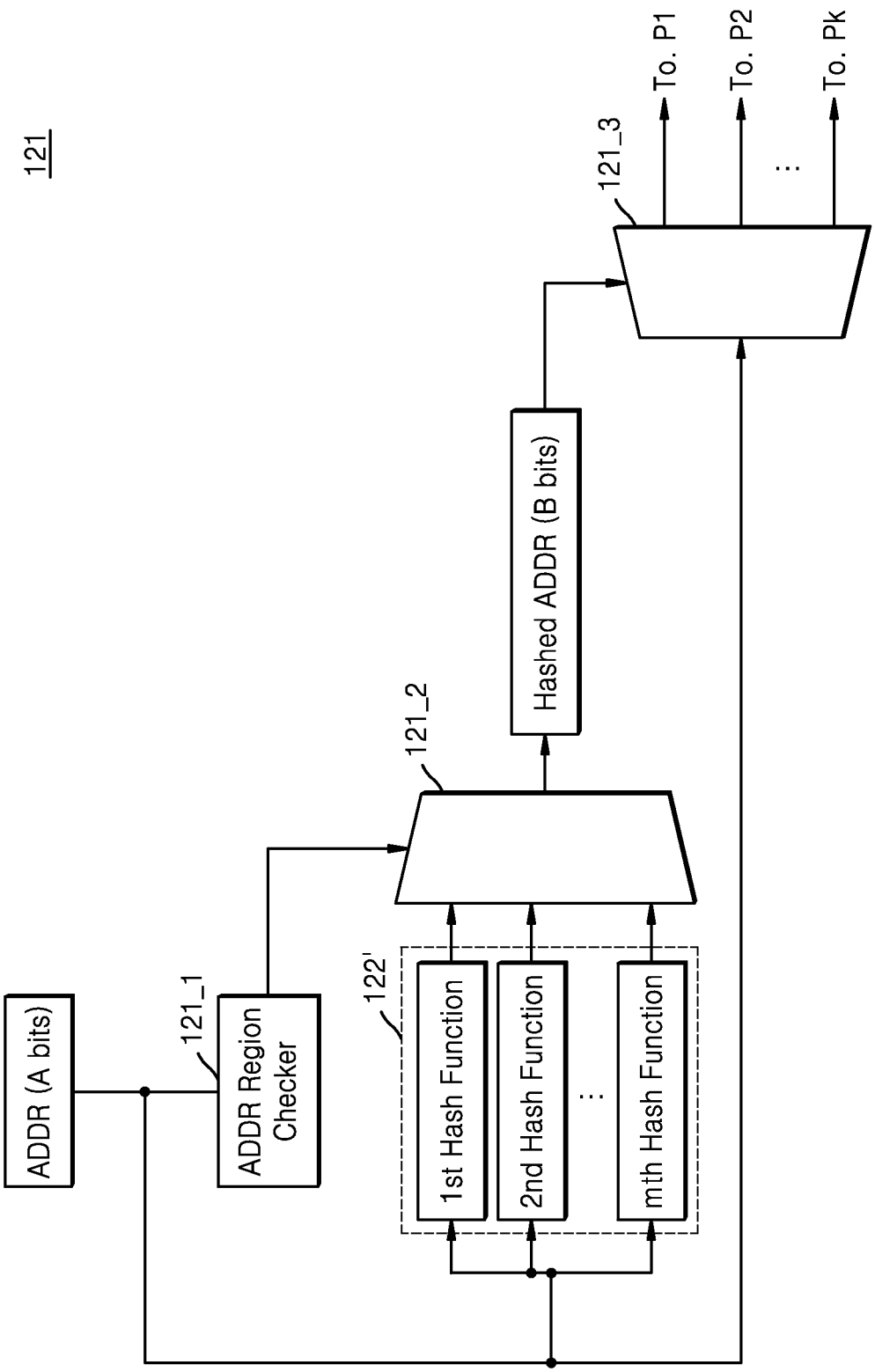
FIGS. 3A and 3B are detailed block diagrams of hash function & port selection circuits of FIG. 1 according to example embodiments.
Figure 3B:
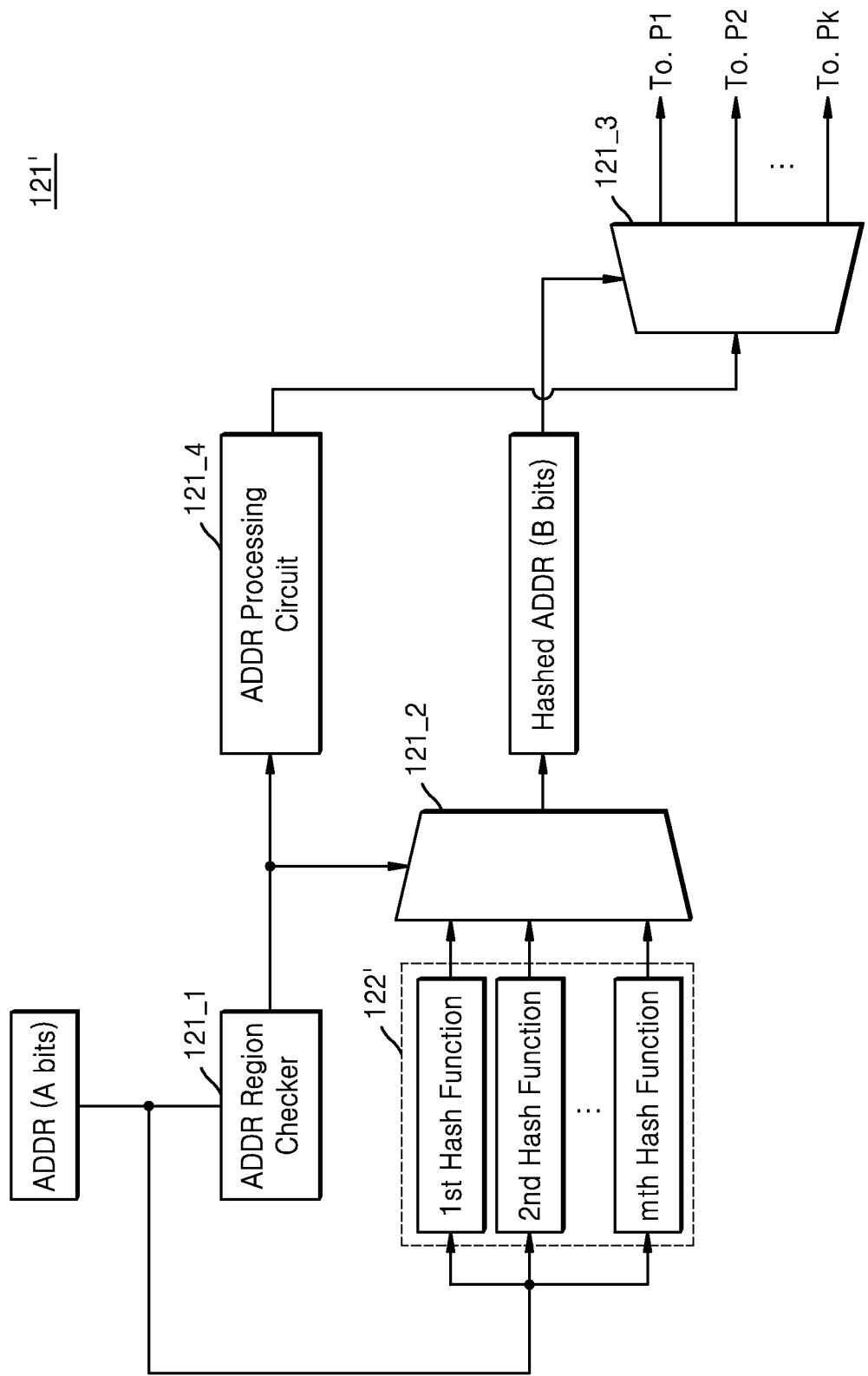

FIGS. 3A and 3B are detailed block diagrams of hash function & port selection circuits according to example embodiments.

Referring to FIG. 3A, the hash function & port selection circuit 121 may include an address region checker 121_1, a multiplexer 121_2, and a demultiplexer 121_3.

In an example embodiment, the address region checker 121_1 may receive addresses ADDR including 'A' bits and determine an address region to which the addresses ADDR belong. The address region checker 121_1 may generate a first selection signal for selecting any one of first to m-th hash functions 122' (where m is an integer greater than or equal to 2) based on determination results and provide the first selection signal to the multiplexer 121_2.

In an example embodiment, the multiplexer 121_2 may output hashed addresses to which a hash function selected from among the first to m-th hash functions 122' is applied, according to the first selection signal. In an example embodiment, the hashed addresses may include 'B' bits, and 'A' may be more than 'B'. Also, a bit configuration of the hashed addresses may depend on the number of first to k-th ports P1 to Pk. For example, when the number of first to k-th ports P1 to Pk is 4 (i.e., when k=4), 'B' may be '2' so that the hashed addresses may respectively represent the first to fourth ports P1 to P4.

In an example embodiment, the demultiplexer 1213 may selectively output the addresses ADDR to at least one of the first to k-th ports P1 to Pk, according to the hashed addresses. For example, the demultiplexer 1213 may alternately output the addresses ADDR to the first and second ports P1 and P2, according to the hashed addresses. As another example, the demultiplexer 1213 may output the addresses ADDR to the first port P1, according to the hashed addresses. As another example, the demultiplexer 121_3 may sequentially select the first and second ports P1 and P2 in response to the hashed addresses to output the addresses ADDR.

Referring further to FIG. 3B, hash function & port selection circuit 121' may further include an address processing circuit 1214, compared to the hash function & port selection circuit 121 of FIG. 3A.

In an example embodiment, the address processing circuit 1214 may process addresses to have a format matching a hash function selected from among first to m-th hash functions (where m is an integer greater than or equal to 2). As an example, the number of bits and bit patterns respectively used in the first to m-th hash functions 122' with respect to one address may be different, and accordingly, additional processing performed on addresses passing through different hash functions may be required. In the present disclosure, a bit pattern may indicate a combination of bits. For example, a first hash function may use a total of two bits including a first bit and a third bit among bits included in one address, and a second hash function may use a total of three bits including a second bit, a fourth bit, and a sixth bit among the bits included in one address. The address processing circuit 1214 may process addresses according to the number of bits and bit patterns used in the first to m-th hash functions 122'.

However, this is an example, and example embodiments are not limited thereto. For example, the address processing circuit 121_4 may process addresses in various ways to support smooth memory access in example embodiments using the plurality of hash functions 122'.

The remaining configuration and operation of the hash function & port selection circuit 121' in FIG. 3B are as described with reference to the hash function & port selection circuit 121 discussed above with respect to FIG. 3A, and thus, descriptions thereof are omitted.

Figure 4:
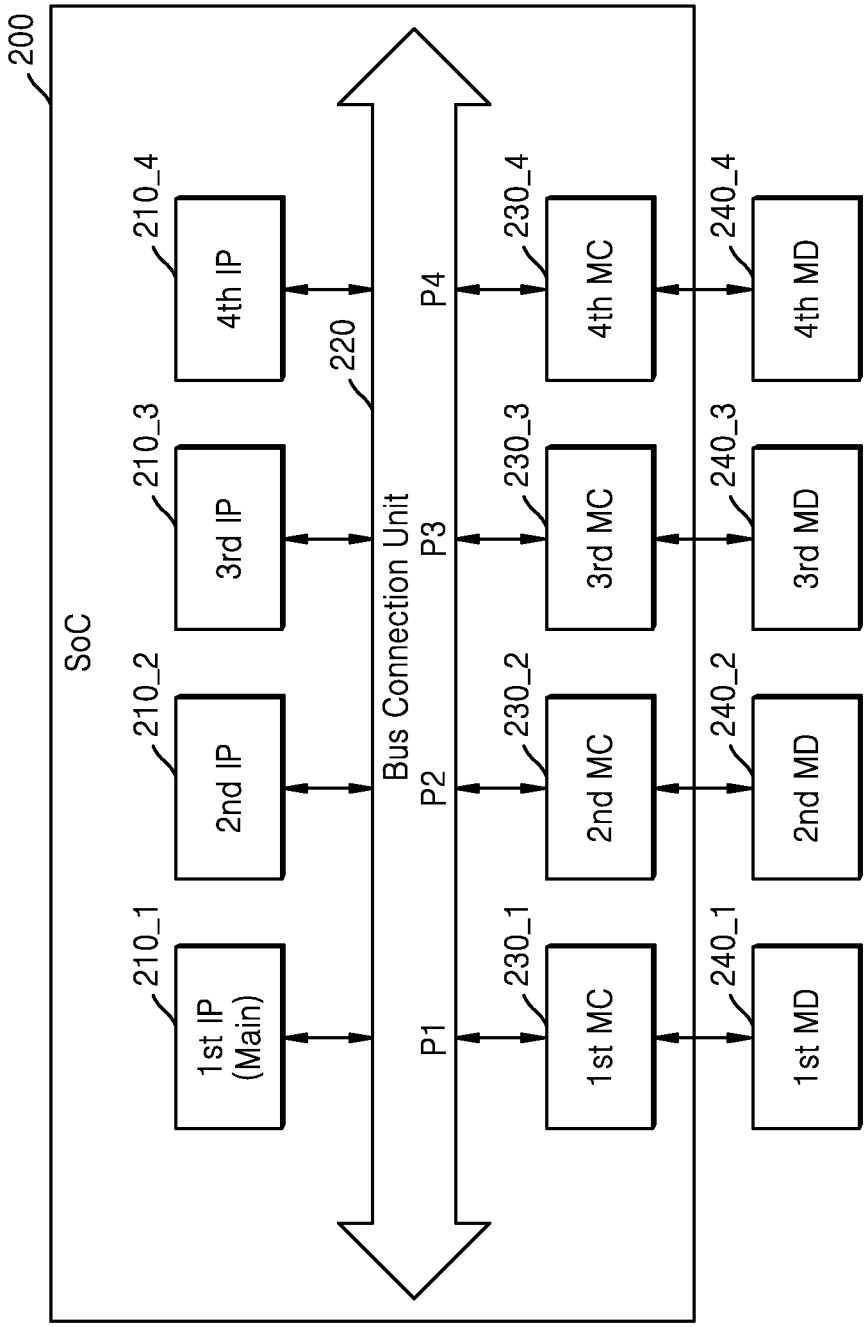
FIG. 4 is a block diagram of a memory system according to an example embodiment.

FIG. 4 is a block diagram of a memory system 20 according to an example embodiment.

Referring to FIG. 4, the memory system 20 may include an SoC 200 and first to fourth memory devices 240_1 to 240_4. The SoC 200 may include first to fourth IPs 210_1 to 210_4, a BCU 220, and first to fourth memory controllers 230_1 to 230_4.

In an example embodiment, the first IP 210_1 may be a main IP, and, as described above, may perform a general operation to enable memory access of the first to fourth IPs 210_1 to 210_4 according to example embodiments.

In an example embodiment, the BCU 220 may determine an address region to which addresses output from the first to fourth IPs 210_1 to 210_4 belong, select any one of a plurality of hash functions with respect to determination results, and apply the selected hash function to the addresses, thereby supporting memory access of the first to fourth IPs 210_1 to 210_4. A specific example embodiment thereof will be described with further reference to FIGS. 5A and 5B.

Figure 5A:
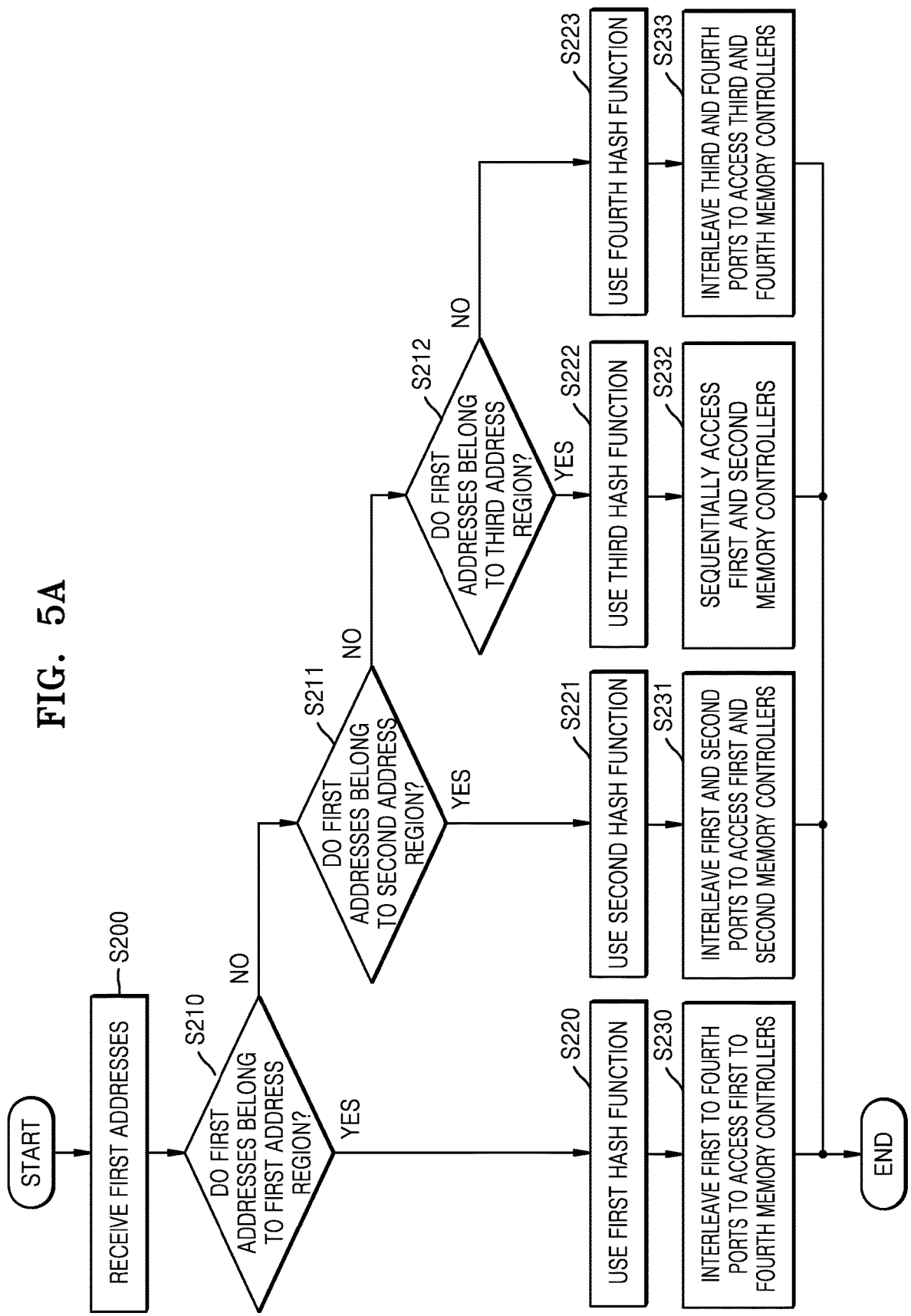
FIG. 5A is a flowchart illustrating an operation method of the SoC of FIG. 4 according to an example embodiment.
Figure 5B:
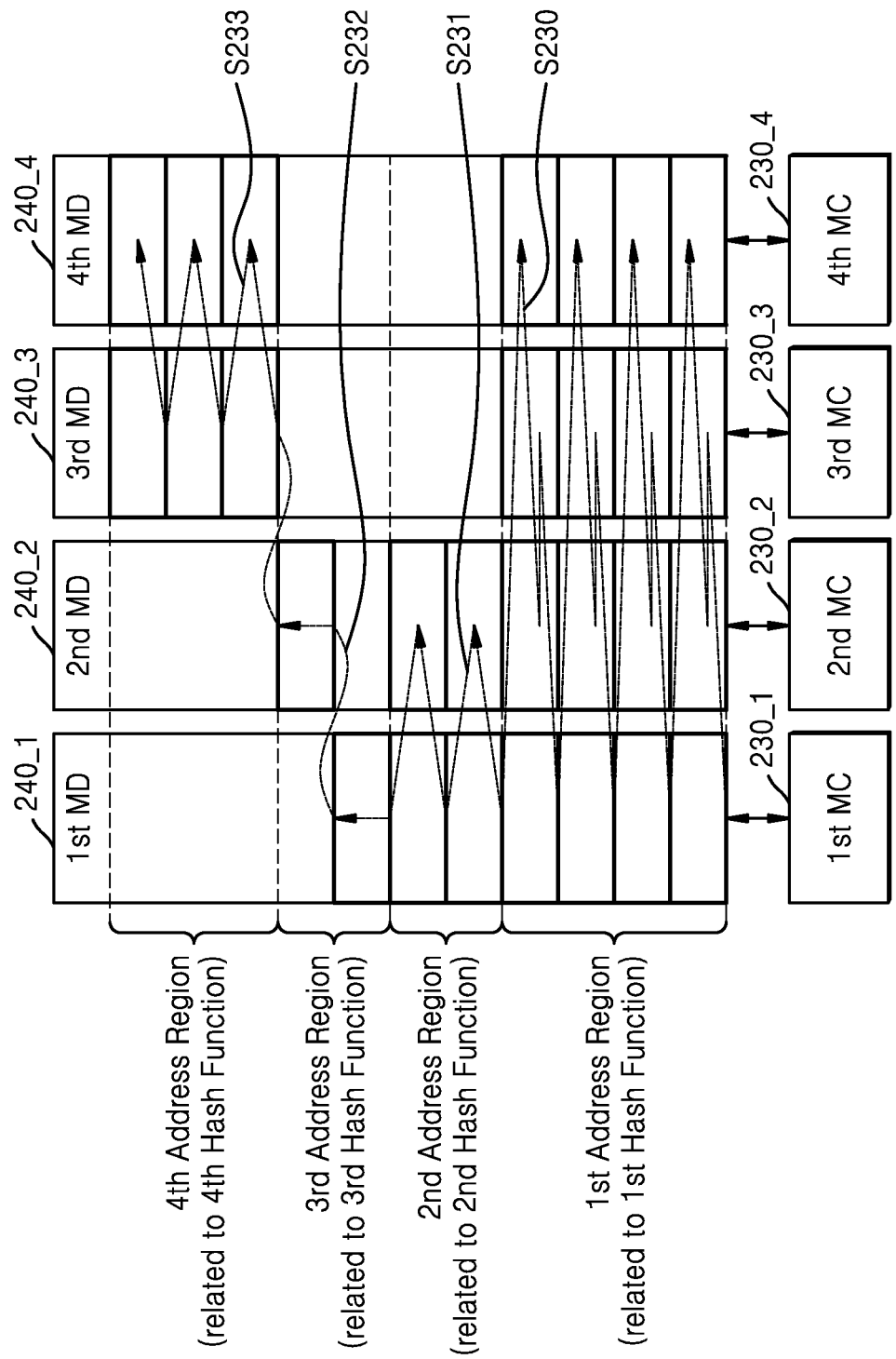
FIG. 5B is a diagram illustrating an operation of the SoC of FIG. 4 according to FIG. 5A according to an example embodiment.

FIG. 5A is a flowchart illustrating an operation method of the SoC 200 of FIG. 4, and FIG. 5B is a diagram illustrating an operation of the SoC 200 of FIG. 4 according to FIG. 5A.

Referring to FIGS. 4 and 5A, in operation S200, the BCU 220 may receive first addresses from the first IP 210_1. In operation S210, the BCU 220 may determine whether first addresses belong to a first address region. When the result of operation S210 is 'NO', the BCU 220 may determine whether the first addresses belong to a second address region in operation S211. When the result of operation S211 is 'NO', the BCU 220 may determine whether the first addresses belong to a third address region in operation S212.

When the result of operation S210 is 'YES', the BCU 220 may determine to selectively use a first hash function and apply the first hash function to the first addresses in operation S220. In operation S230, the BCU 220 may interleave the first to fourth ports P1 to P4 to access the first to fourth memory controllers 230_1 to 230_4.

Referring further to FIG. 5B, the first to fourth memory controllers 230_1 to 230_4 may control memory operations of the first to fourth memory devices 240_1 to 240_4, based on the first addresses received using an interleaving access method through the first to fourth ports P1 to P4 in operation S230. That is, the first IP 210_1 may perform memory access by repeatedly accessing the first memory device 240_1, the third memory device 240_3, the second memory device 240_2, and the fourth memory device 240_4 in that order.

Referring to FIG. 5A, when the result of operation S211 is 'YES', the BCU 220 may determine to selectively use a second hash function and apply the second hash function to the first addresses in operation S221. In operation S231, the BCU 220 may interleave the first and second ports P1 and P2 to access the first and second memory controllers 230_1 and 230_2.

Referring back to FIG. 5B, the first and second memory controllers 230_1 and 230_2 may control memory operations of the first and second memory devices 240_1 and 240_2, based on the first addresses received using the interleaving access method through the first and second ports P1 and P2 in operation S231. That is, the first IP 210_1 may perform memory access by repeatedly accessing the first memory device 240_1 and the second memory device 240_2 in that order.

Referring to FIG. 5A, when the result of operation S212 is 'YES', the BCU 220 may determine to selectively use a third hash function and apply the third hash function to the first addresses in operation S222. In operation S232, the BCU 220 may sequentially access the first and second memory controllers 230_1 and 230_2 through the first and second ports P1 and P2.

Referring back to FIG. 5B, the first and second memory controllers 230_1 and 230_2 may control the memory operations of the first and second memory devices 240_1 and 240_2, based on the first addresses received using the interleaving access method through the first and second ports P1 and P2 in operation S232. That is, when the first IP 210_1 first accesses the first memory device 240_1 and then uses a certain memory capacity, the first IP 210_1 may sequentially perform memory access to the second memory device 240_2. For example, the specific memory capacity is preset, and the first IP 210_1 may access the second memory device 240_2 after using only the specific memory capacity of the first memory device 240_1.

Referring to FIG. 5A, when the result of operation S212 is 'NO', the BCU 220 may determine to selectively use a fourth hash function and apply the fourth hash function to the first addresses in operation S233. In operation S233, the BCU 220 may interleave the third and fourth ports P3 and P4 to access the third and fourth memory controllers 230_3 and 230_4.

Referring back to FIG. 5B, the first and second memory controllers 230_1 and 230_2 may control memory operations of the third and fourth memory devices 240_3 and 240_4, based on the first addresses received using the interleaving access method through the third and fourth ports P3 and P4 in operation S233. That is, the first IP 210_1 may perform memory access by repeatedly accessing the third memory device 240_3 and the fourth memory device 240_4 in that order.

Although an example in which memory is accessed through at least two ports is described with reference to FIGS. 5A and 5B, this is only an example, and example embodiments are not limited thereto. For example, other example embodiments including an example embodiment of memory access through a single port may be implemented.

Figure 6:
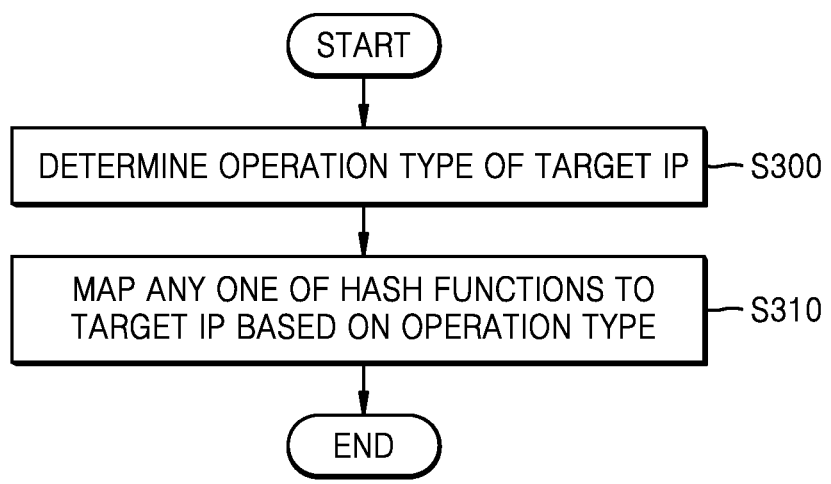
FIG. 6 is a flowchart illustrating an operation method of the SoC of FIG. 4 according to an example embodiment.

FIG. 6 is a flowchart illustrating an operation method of the SoC 200 of FIG. 4, according to an example embodiment.

Referring to FIGS. 4 and 6, in operation S300, a main IP, for example the first IP 210_1, may determine an operation type of a target IP. The target IP may be any one of the first to fourth IPs 210_1 to 210_4. In the present disclosure, the operation type of the target IP may be based on a memory capacity required in a data processing operation of the target IP, a data read/write request rate, etc. When the target IP supports a plurality of operation modes, the operation type of the target IP may vary depending on a current operation mode. Also, the operation type of the target IP may indicate, and may be referred to as, a type of the data processing operation of the target IP. In operation S310, the first IP 210_1 may map any one of a plurality of hash functions to the target IP, based on the operation type of the target IP. The mapped hash function is applied to addresses output from the target IP, and thus, a memory access method suitable for the operation type of the target IP may be provided to the target IP.

According to the operation method of FIG. 6, the first IP 210_1 may map at least one of the hash functions to each of the first to fourth IPs 210_1 to 210_4, and generate hash function mapping information indicating mapping results. The hash function mapping information may be used for power management of the SoC 200, and a specific example embodiment thereof will be described with reference to FIG. 8.

Figure 7:
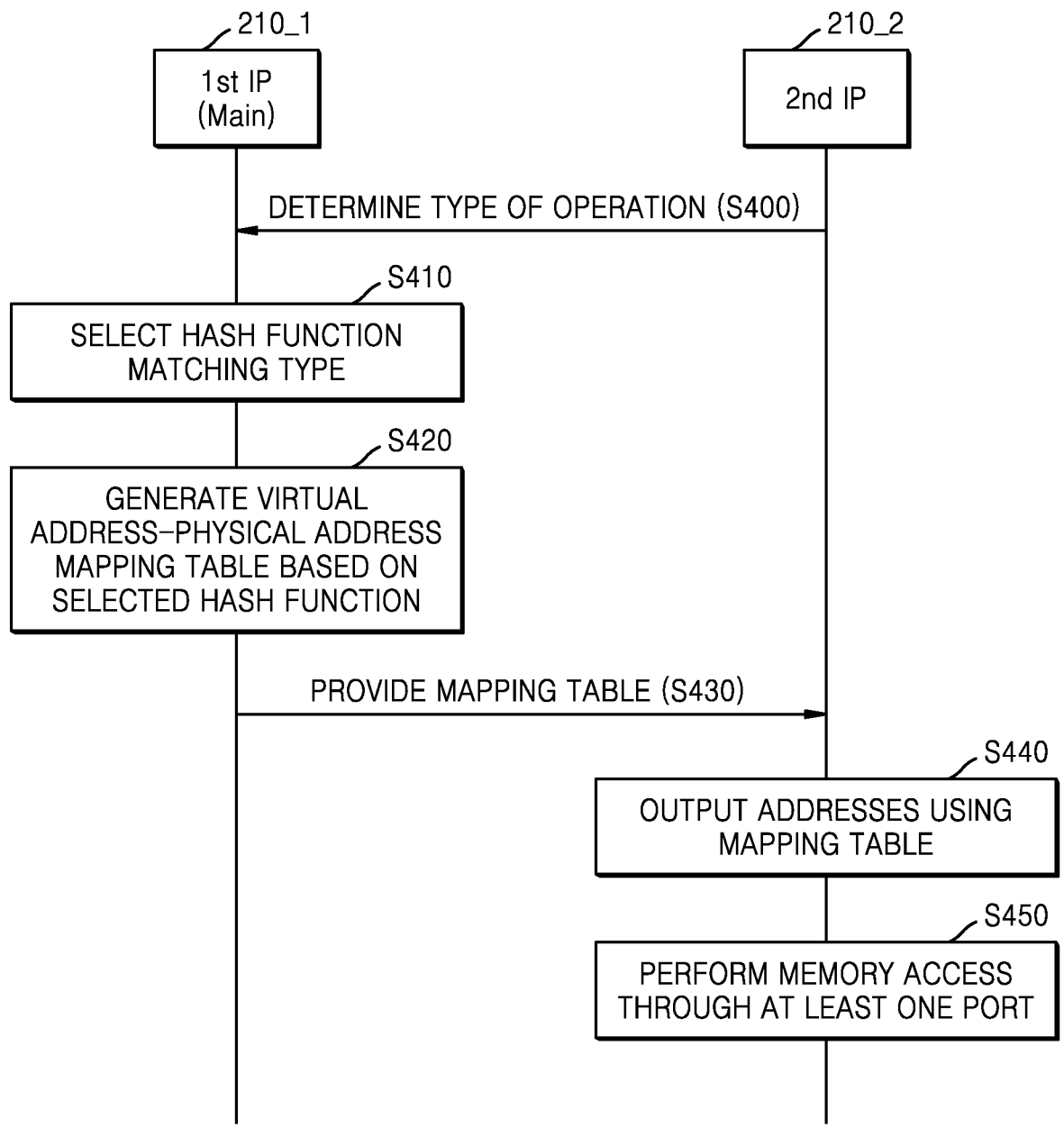
FIG. 7 is a flowchart illustrating an operation method of a first intellectual property (IP) and a second IP of FIG. 4 according to an example embodiment.

FIG. 7 is a flowchart illustrating an operation method of the first IP 210_1 and the second IP 210_2 of FIG. 4, according to an example embodiment.

Referring to FIG. 7, in operation S400, the first IP 210_1 may determine a type of a data processing operation of the second IP 210_2. In an example embodiment, the first IP 210_1 may receive information about the type of the data processing operation from the second IP 210_2 to perform operation S400. In operation S410, the first IP 210_1 may select a hash function matching the type determined in operation S400 from among a plurality of hash functions. In operation S420, the first IP 210_1 may generate a virtual address-physical address mapping table for the second IP 210_2 based on the selected hash function. In the present disclosure, the virtual address-physical address mapping table may be referred to as a mapping table. Operations S410 and S420 may be included in a mapping operation, such as operation S310 of FIG. 6. In operation S430, the first IP 210_1 may provide the generated mapping table to the second IP 210_2. In operation S440, the second IP 210_2 may output addresses belonging to an address region corresponding to the hash function selected in operation S410 by using the mapping table. Specifically, the second IP 210_2 may first generate virtual addresses for memory access, convert the virtual addresses into physical addresses by referring to the mapping table, and output the physical addresses. As described above, the mapping table may guide to the addresses of the second IP 210_2 so that the hash function selected in operation S410 may be applied to the addresses output from the second IP 210_2.

In some example embodiments, the first IP 210_1 may generate a mapping table corresponding to the type of data processing operation for each of the IPs 210_1, 210_2, 210_3 and 210_4, and may provide the mapping table to each of the IPs 210_1, 210_2, 210_3 and 210_4.

Figure 8:
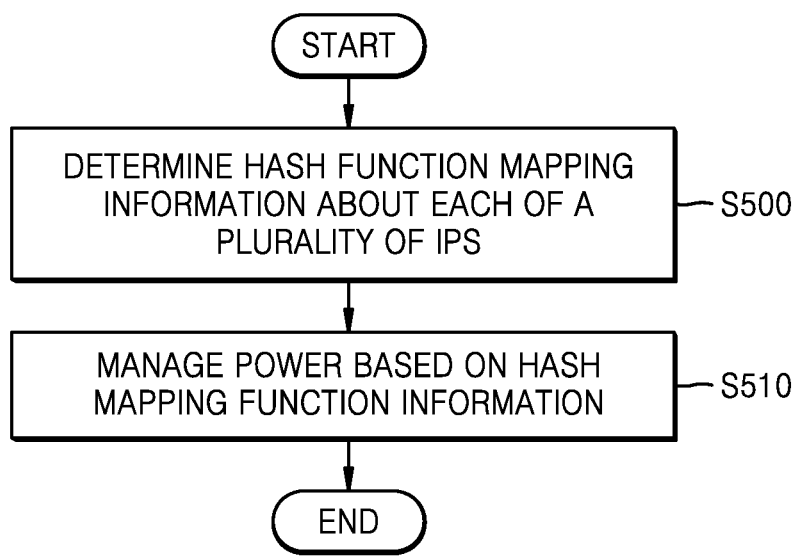
FIG. 8 is a flowchart illustrating an operation method of an SoC according to an example embodiment.

FIG. 8 is a flowchart illustrating an operation method of an SoC, such as the SoC 100 or the SoC 200, according to an example embodiment.

Referring to FIG. 8, in operation S500, a power management integrated circuit of the SoC may determine hash function mapping information about each of a plurality of IPs. In operation S510, the power management integrated circuit may manage power based on the hash function mapping information. Specifically, the power management integrated circuit may turn on only memory controllers used for some memory access with reference to the hash function mapping information when only some of a plurality of IPs perform a data processing operation, and turn off memory controllers that are not used, thereby reducing power consumption.

Figure 9:
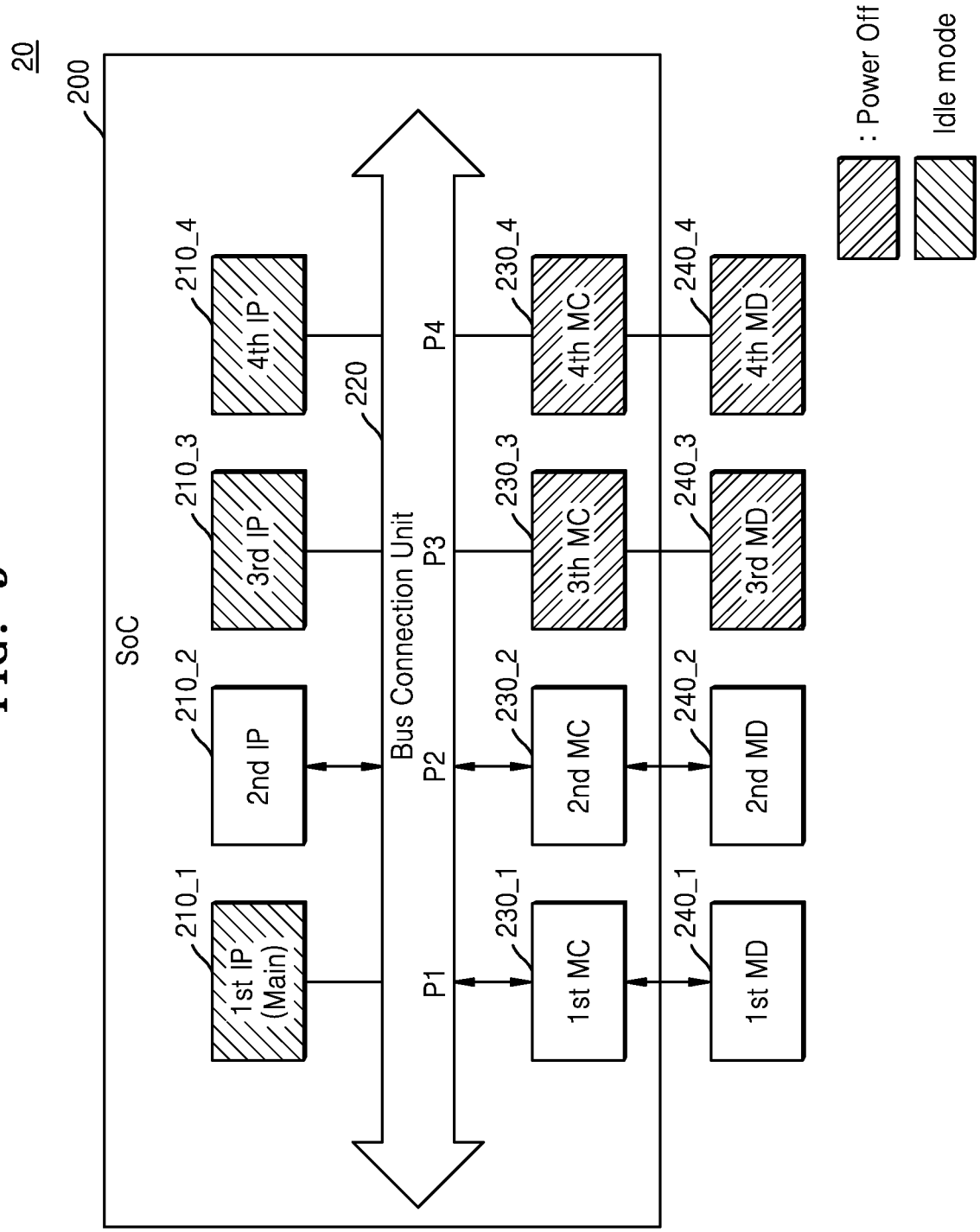
FIG. 9 is a block diagram illustrating a power management method of an SoC according to an example embodiment.

FIG. 9 is a block diagram illustrating a power management method of the SoC 200 according to an example embodiment. Hereinafter, a description redundant with that given with reference to FIG. 4 will be omitted, and description will be given based on the example embodiment described with reference to FIGS. 5A and 5B.

Referring to FIG. 9, the SoC 200 may include the first to fourth IPs 210_1 to 210_4, the BCU 220, the first to fourth memory controllers 230_1 to 230_4, and a power management integrated circuit.

In an example embodiment, only the second IP may be used to perform a data processing operation. In this case, the first, third, and fourth IPs 210_1, 210_3, and 210_4 may operate in an idle mode in which a data processing operation is not performed, and only the second IP 210_2 may perform the data processing operation. In some example embodiments, the first, third, and fourth IPs 210_1, 210_3, and 210_4 may be in a power-off state.

In an example embodiment, the power management integrated circuit may determine a hash function mapped to the second IP 210_2 currently performing the data processing operation by referring to hash function mapping information. When a second hash function is mapped to the second IP 210_2, as described with reference to FIGS. 5A and 5B, the second IP 210_2 may access the first and second memory controllers 230_1 and 230_2 by using an interleaving access method. That is, because the second IP 210_2 uses only the first and second memory controllers 230_1 and 230_2, the power management integrated circuit may power off the third and fourth memory controllers 230_3 and 230_4.

Furthermore, the third and fourth memory devices 240_3 and 240_4 may also be powered off under the control by the third and fourth memory controllers 230_3 and 230_4, respectively.

Figure 10:
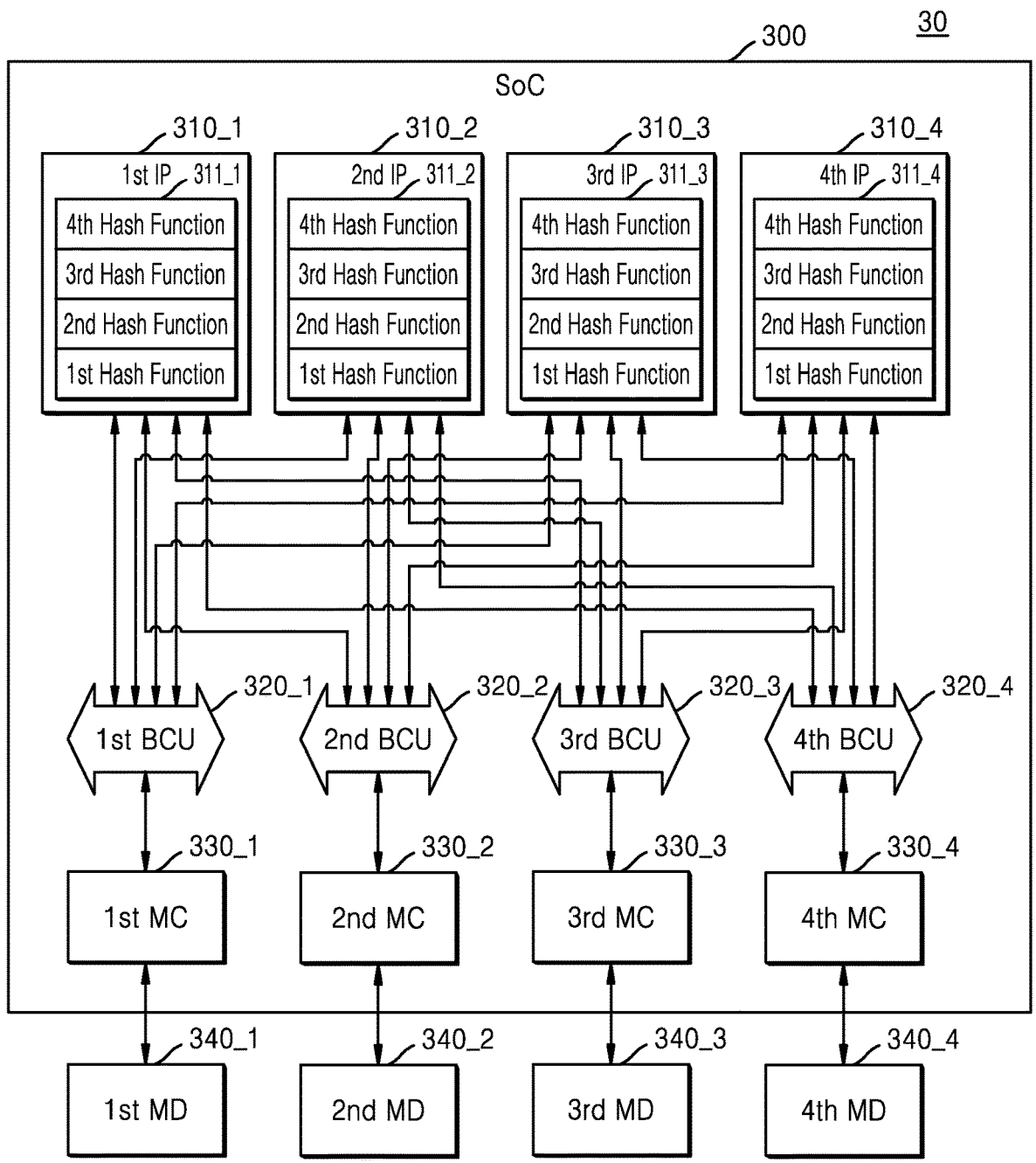
FIG. 10 is a block diagram illustrating a memory system according to an example embodiment.

FIG. 10 is a block diagram illustrating a memory system 30 according to an example embodiment.

Referring to FIG. 10, the memory system 30 may include an SoC 300 and first to fourth memory devices 340_1 to 340_4. The SoC 300 may include first to fourth IPs 310_1 to 310_4, first to fourth BCUs 320_1 to 320_4, and first to fourth memory controllers 330_1 to 330_4.

In an example embodiment, the first to fourth IPs 310_1 to 310_4 may be connected to the first to fourth BCUs 320_1 to 320_4, respectively. The first to fourth BCUs 320_1 to 320_4 may be respectively connected to the first to fourth memory controllers 330_1 to 330_4. The first to fourth memory controllers 330_1 to 330_4 may be respectively connected to the first to fourth memory devices 340_1 to 340_4.

In an example embodiment, the first to fourth IPs 310_1 to 310_4 may include first to fourth hash functions 311_1 to 311_4, respectively. For example, each of the first to fourth IPs 310_1 to 310_4 may include a non-volatile memory storing four different hash functions. As an example, the first IP 310_1 may determine an address region to which addresses output from the first IP 310_1 belong, and select any one hash function from among the first to fourth hash functions 311_1 to 311_4 based on the determined address region. The first IP 310_1 may generate hashed addresses by applying the selected hash function to the addresses, and may select at least one of the first to fourth BCUs 311_1 to 311_4 based on the hashed addresses. The first IP 310_1 may output the addresses to the selected at least one BCU. In a manner similar to that of the first IP 310_1, the remaining IPs 310_2 to 310_4 may also select at least one of the first to fourth BCUs 311_1 to 311_4. That is, the SoC 300 shown in FIG. 10 may include the plurality of BCUs 320_1 to 320_4 compared to the example embodiments of the SoC 100 described with reference to FIG. 1, etc., and instead of the BCU 120, the plurality of IPs 310_1 to 310_4 may directly select any one of the plurality of hash functions 311_1 to 311_4 and apply the selected hash function to addresses of the plurality of IPs 310_1 to 310_4. As described above, the SoC 300 includes the plurality of BCUs 320_1 to 320_4, and individually disposes the plurality of BCUs 320_1 to 320_4 at optimal positions, thereby reducing a design complexity of the SoC 300. In this regard, the plurality of IPs 310_1 to 310_4 may output addresses by selecting at least one of the BCUs 320_1 to 320_4 using a plurality of hash functions.

In an example embodiment, at least one BCU receiving the addresses among the first to fourth BCUs 320_1 to 320_4 may transmit the addresses to the memory controllers 330_1 to 330_4 connected thereto, respectively.

It will be understood that the example embodiments described with reference to FIGS. 1 to 9 may also be applied to the memory system 30 of FIG. 10.

The implementation example of the memory system 30 illustrated in FIG. 10 is only an example, and example embodiments, are not limited thereto, and various structures are applicable.

Figure 11A:
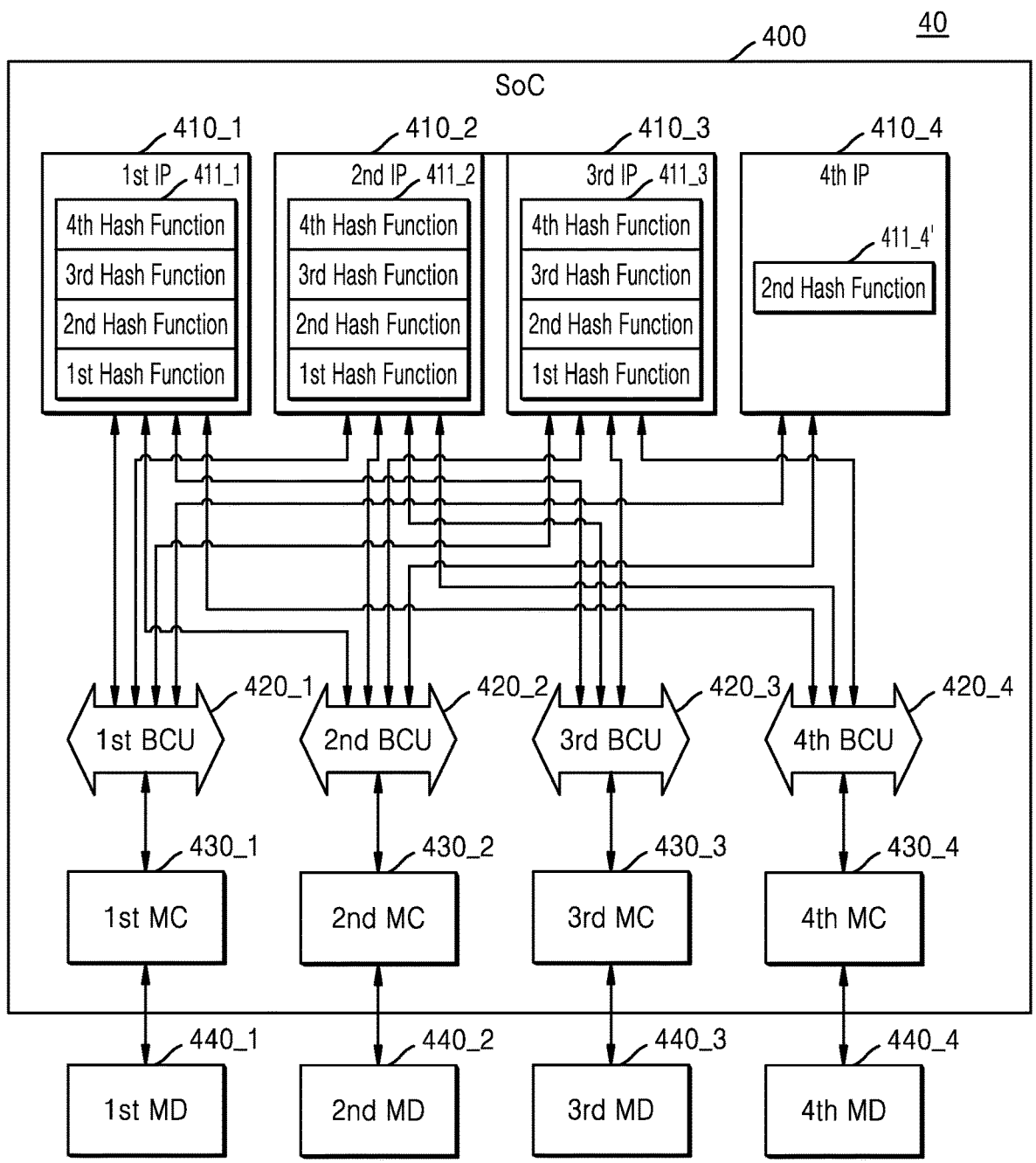
FIG. 11A is a block diagram illustrating a memory system according to an example embodiment.
Figure 11B:
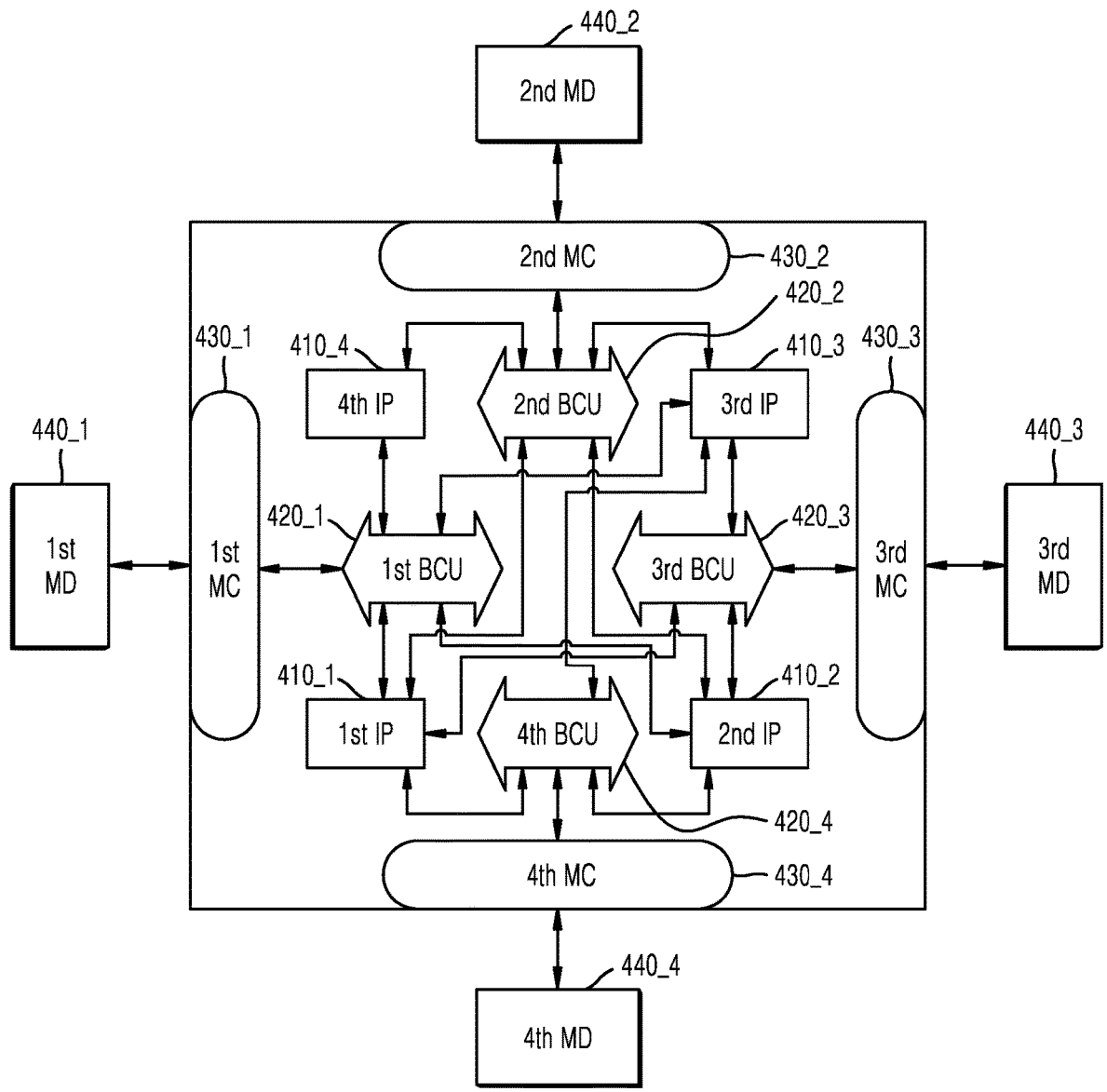
FIG. 11B is a block diagram illustrating an arrangement of the memory system of FIG. 11A according to an example embodiment.

FIG. 11A is a block diagram illustrating a memory system 40 according to an example embodiment, and FIG. 11B is a block diagram illustrating an arrangement example of the memory system 40 of FIG. 11A.

Referring to FIG. 11A, the memory system 40 may include an SoC 400 and first to fourth memory devices 440_1 to 440_4. The SoC 400 may include first to fourth IPs 410_1 to 410_4, first to fourth BCUs 420_1 to 420_4, and first to fourth memory controllers 430_1 to 430_4.

In an example embodiment, each of the first to third IPs 410_1 to 410_3 may include first to fourth hash functions 411_1 to 411_3, and the fourth IP 410_4 may include a second hash function 411_4'. The fourth IP 410_4 may include only the second hash function 411_4' among the first to fourth hash functions 411_1 to 411_4 compared to the other IPs 410_1 to 410_3. In an example embodiment, the fourth IP 410_4 may be set or designed to use only a specific address region (e.g., the second address region), and accordingly, the fourth IP 410_4 may include only the second hash function 411_4'. For example, each of the first to fourth IPs 410_1 to 410_4 may include a non-volatile memory, and the non-volatile memory of each of the first to third IPs 410_1 to 410_3 may store four hash functions, and the non-volatile memory of the fourth IP may store only a single hash function.

In an example embodiment, each of the first to third IPs 410_1 to 410_3 may be connected to all the first to fourth BCUs 420_1 to 420_4. In addition, as described with reference to FIGS. 5A and 5B, when the second hash function 411_4' is applied to addresses, because only the first and second memory controllers 430_1 and 430_2 are used, the fourth IP 410_4 may be connected only to the first and second BCUs 420_1 and 420_2.

However, FIG. 11A is only an example embodiment, and at least one of the first to third IPs 410_1 to 410_3 may use only some of a plurality of hash functions, and the first to third IPs 410_1 to 410_3 may be variously connected to the BCUs 420_1 to 420_4 according to hash functions used by the first to third IPs 410_1 to 410_3.

Referring further to FIG. 11B, the fourth IP 410_4 may be disposed adjacent to the first and second BCUs 420_1 and 420_2 connected thereto. Accordingly, the complexity of internal routing of the SoC 400 may be reduced, and an efficient design of the SoC 400 may be possible.

Also, in an example embodiment, when only the fourth IP 410_4 performs a data processing operation, the third and fourth BCUs 420_3 and 420_4, and the third and fourth memory controllers 430_3 and 430_4, which are not used for power management, may be powered off.

Figure 12:
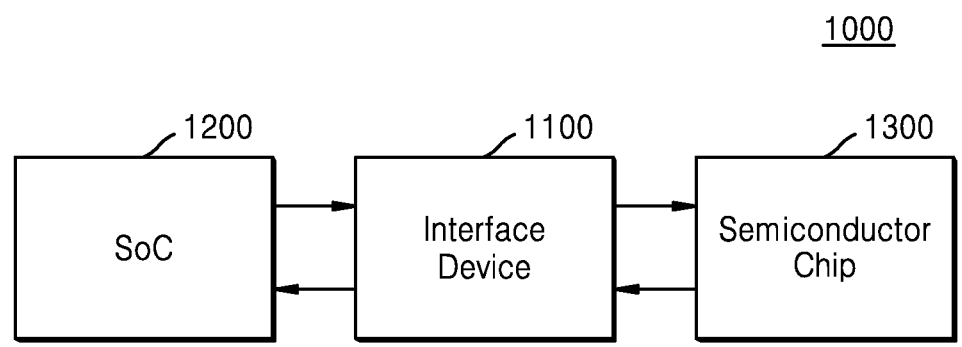
FIGS. 12 and 13 are diagrams illustrating an electronic system according to example embodiments.
Figure 13:
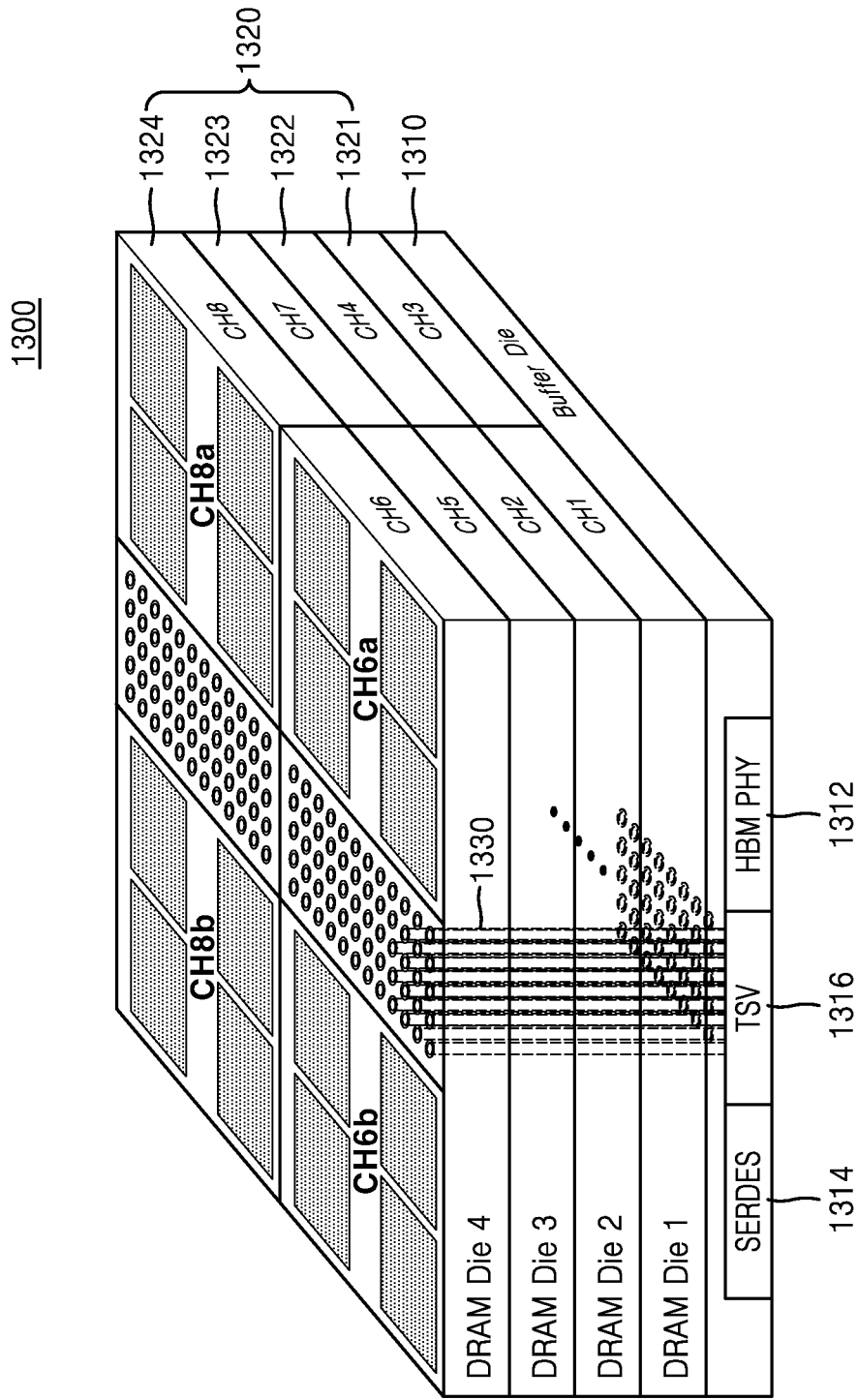

FIGS. 12 and 13 are diagrams illustrating an electronic system 1000 according to example embodiments.

Referring to FIG. 12, the electronic system 1000 may include an interface device 1100 (or an interface chip), an SoC 1200 to which example embodiments are applied, and a semiconductor chip 1300. In some example embodiments, the SoC 1200 may be referred to as a processing device, and the semiconductor chip 1300 may be referred to as a memory device. The SoC 1200 may function as a host or an application processor. The SoC 1200 may include a system bus to which a protocol having a certain standard bus standard is applied, and may include various IPs connected to the system bus. The system bus may be a BCU in FIGS. 1 to 11B.

As a standard specification of the system bus, an Advanced Microcontroller Bus Architecture (AMBA) protocol of Advanced RISC Machine (ARM) may be applied. A bus type of the AMBA protocol may include Advanced High-Performance Bus (AHB), Advanced Peripheral Bus (APB), Advanced eXtensible Interface (AXI), AXI4, AXI Coherency Extensions (ACE), etc. In addition, other types of protocols, such as uNetwork of Sonics Inc., CoreConnect of IBM, Open Core Protocol of OCPIP, etc., may be used.

The example embodiments described with reference to FIGS. 1 to 11B may be applied to the IPs and the system bus of the SoC 1200. That is, the IPs and the system bus may support memory access to the semiconductor chip 1300 by using a plurality of hash functions.

FIG. 13 is further referenced to describe the configuration of the semiconductor chip 1300. The semiconductor chip 1300 may be a high bandwidth memory (HBM) including a plurality of channels CH1 to CH8 having independent interfaces. The semiconductor chip 1300 may include a plurality of dies, and may include a buffer die 1310 and a plurality of memory dies 1320 stacked on the buffer die 1310. For example, a first memory die 1321 may include a first channel CH1 and a third channel CH3, a second memory die 1322 may include a second channel CH2 and a fourth channel CH4, a third memory die 1323 may include the fifth channel CH5 and the seventh channel CH7, and a fourth memory die 1324 may include the sixth channel CH6 and the eighth channel CH8.

The buffer die 1310 may be connected to the interface device 1100 through a conductor formed on an outer surface of the semiconductor chip 1300, for example, bumps or solder balls. The buffer die 1310 may receive a command, address, and data from the SoC 1200 through the interface device 1100, and provide the received command, address, and data to at least one of the plurality of memory dies 1320. Also, the buffer die 1310 may provide data output from at least one channel among the plurality of memory dies 1320 to the SoC 1200 through the interface device 1100.

The semiconductor chip 1300 may include a plurality of through silicon vias (TSVs) 1330 respectively passing through the plurality of memory dies 1320. Each of the channels CH1 to CH8 may be separated into left and right portions. For example, in the fourth memory die 1324, the sixth channel CH6 may be divided into pseudo channels CH6a and CH6b, and the eighth channel CH6 may be divided into pseudo channels CH8a and CH8b. The TSVs 1330 may be disposed between the pseudo channels CH6a and CH6b of the sixth channel CH6 and between the pseudo channels CH8a and CH8b of the eighth channel CH8.

The buffer die 1310 may include a TSV region 1316, a SERDES region 1314, and an HBM physical layer interface, that is, an HBM PHY region 1312. The TSV region 1316 is a region in which the TSV 1330 for communication with the plurality of memory dies 1320 is formed.

The SERDES region 1314 is a region that provides the SERDES interface of the Joint Electron Device Engineering Council (JEDEC) standard as processing throughput of the SoC 1200 increases and demands for memory bandwidth increase. The SERDES region 1314 may include a SERDES transmitter, a SERDES receiver, and a controller. The SERDES transmitter includes a parallel-to-serial circuit and a transmitter, and may receive a parallel data stream and serialize the received parallel data stream. The SERDES receiver includes a receiver amplifier, an equalizer, a clock and data recovery (CDR) circuit, and a serial-to-parallel circuit, and may receive a serial data stream and parallelize the received serial data stream. The controller includes an error detection circuit, an error correction circuit, and registers, such as First In First Out (FIFO) register.

The HBM PHY region 1312 may include physical or electrical hierarchies and logical hierarchies provided for signal, frequency, timing, driving, detailed operating parameter and functionality required for efficient communication between the SoC 1200 and the semiconductor chip 1300. The HBM PHY region 1312 may perform memory interfacing, such as selecting a row and column corresponding to a memory cell, writing data into the memory cell, or reading the written data. The HBM PHY region 1312 may support features of the HBM protocol of the JEDEC standard.

The interface device 1100 may equalize signals provided from the SoC 1200 and transmit the signals to the semiconductor chip 1300, and may equalize the signals provided from the semiconductor chip 1300 and transmit the signals to the SoC 1200. The interface device 1100 may interface with the SoC 1200 and the semiconductor chip 1300 so that data communication between the SoC 1200 and the semiconductor chip 1300 may be performed.

The semiconductor chip 1300 illustrated in FIG. 13 is an example, embodiments are not limited thereto, and other types of memory structures may be implemented.

Figure 14:
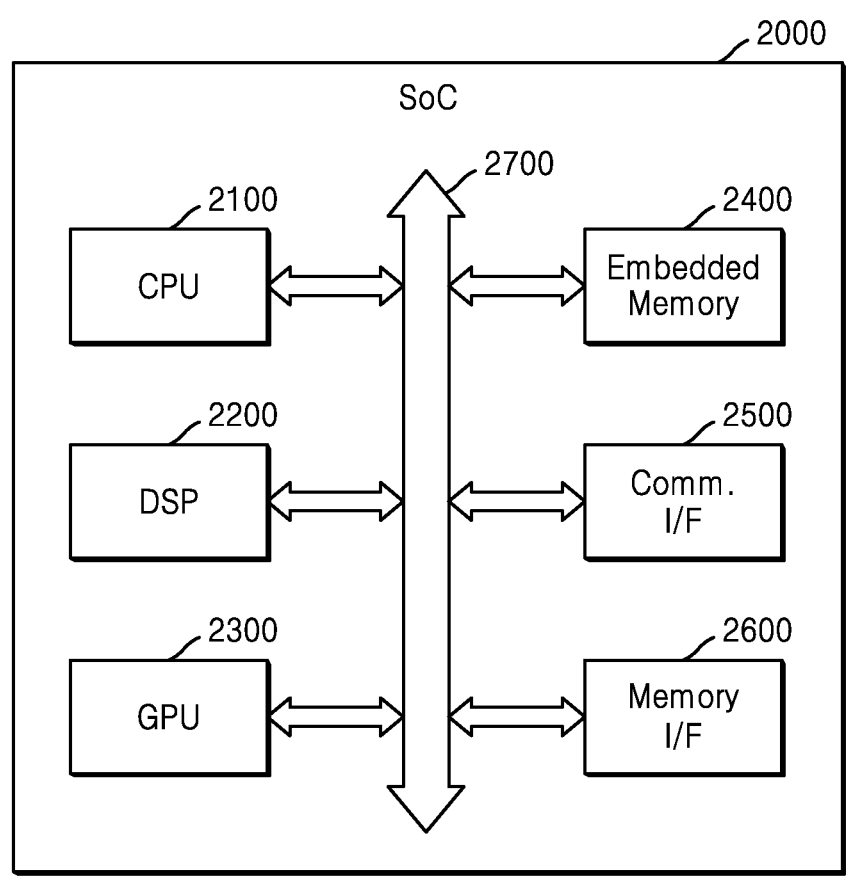
FIG. 14 is a block diagram illustrating an SoC according to an example embodiment.

FIG. 14 is a block diagram illustrating an SoC 2000 according to an example embodiment. The SoC 2000 may refer to an integrated circuit in which components of a computing system or another electronic system are integrated. For example, an SoC may be an application processor (AP) and may include a processor and components for performing other functions.

Referring to FIG. 14, the SoC 2000 may include a CPU 2100, a DSP 2200, a GPU 2300, an embedded memory 2400, a communication interface 2500, a memory interface 2600, and a system bus 2700. Components of the SoC 2000 may communicate with each other through the system bus 2700.

The CPU 2100 may process instructions and control operations of the components included in the SoC 2000. For example, the CPU 2100 may drive an operating system and execute applications using the operating system by processing a series of instructions. The DSP 2200 may generate useful data by processing a digital signal, such as a digital signal provided from the communication interface 2500. The GPU 2300 may generate data for an image output through a display device from image data provided from the embedded memory 2400 or the memory interface 2600, or may encode the image data. The embedded memory 2400 may store data necessary for the CPU 2100, the DSP 2200, and the GPU 2300 to operate. The memory interface 2600 may provide an interface with respect to an external memory of the SoC 2000, for example, dynamic random access memory (DRAM), flash memory, etc.

The communication interface 2500 may provide serial communication with the outside of the SoC 2000. For example, the communication interface 2500 may be connected to Ethernet and may include SERDES for serial communication.

The example embodiments described with reference to FIGS. 1 to 11B may be applied to the CPU 2100, the DSP 2200, the GPU 2300, the system bus 2700, and the memory interface 2600. Specifically, the system bus 2700 may provide memory access suitable for each of the CPU 2100, the DSP 2200, and the GPU 2300 by selectively using a plurality of hash functions for each address region. The memory interface 2600 may transmit addresses transferred from the system bus 2700 to memory devices. The memory interface 2600 may serve as memory controllers of FIGS. 1 to 11B.

In some example embodiments, each of the components represented by a block as illustrated in FIGS. 1, 3A, 3B, 4, 7, 9, 10, 11A, 11B and 12-14 may be implemented as various numbers of hardware, software and/or firmware structures that execute respective functions described above, according to embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. A system on chip comprising:
a plurality of memory controllers respectively connected to a plurality of memory devices;
a plurality of logic circuits, each logic circuit of the plurality of logic circuits being configured to perform a data processing operation using at least one of the plurality of memory controllers; and
a bus connection interface configured to select a first hash function from among a plurality of hash functions based on a first address region corresponding to first addresses received from a first logic circuit from among the plurality of logic circuits, obtain hashed first addresses by applying the first hash function to the first addresses, and connect at least one of the plurality of memory controllers to the first logic circuit using a first access method that corresponds to the hashed first addresses.

2. The system on chip of claim 1, wherein the first access method is one among a plurality of access methods, and
wherein the plurality of access methods respectively correspond to the plurality of hash functions and are different from each other.

3. The system on chip of claim 2, wherein the bus connection interface is further configured to select the first access method from among the plurality of access methods based on the first address region and whether an interleaving access method is supported.

4. The system on chip of claim 1, wherein the bus connection interface comprises a plurality of ports respectively connected to the plurality of memory controllers, and is configured to output the first addresses to at least one port selected from among the plurality of ports according to the first access method.

5. The system on chip of claim 4, wherein the bus connection interface is configured to, process the first addresses according to the first hash function.

6. The system on chip of claim 1, wherein the bus connection interface is configured to select a second hash function from among the plurality of hash functions based on a second address region corresponding to second addresses received from a second logic circuit from among the plurality of logic circuits, obtain hashed second addresses by applying the second hash function to the second addresses, and connect at least one of the plurality of memory controllers to the second logic circuit using a second access method that corresponds to the hashed second addresses.

7. The system on chip of claim 6, wherein the first access method is different from the second access method.

8. The system on chip of claim 6, wherein a size of the first address region is different from a size of the second address region.

9. The system on chip of claim 1, wherein a main logic circuit, among the plurality of logic circuits, is configured to map the first hash function to the first logic circuit before the first logic circuit outputs the first addresses.

10. The system on chip of claim 9, wherein the main logic circuit is configured to identify the first hash function from among the plurality of hash functions based on a type of the data processing operation the first logic circuit is configured to perform.

11. The system on chip of claim 9, wherein the main logic circuit is configured to generate a virtual address-physical address mapping table and provide the virtual address-physical address mapping table to the first logic circuit, and
wherein the first logic circuit is configured to output the first addresses corresponding to the first address region, based on the virtual address-physical address mapping table.

12. The system on chip of claim 1, further comprising a power management integrated circuit configured to control a power state of the plurality of memory controllers based on mapping information indicating a relationship between the plurality of logic circuits and the plurality of hash functions.

13. The system on chip of claim 1, wherein the plurality of logic circuits are divided into a plurality of logic circuit groups based on data access characteristic, and wherein the bus connection interface is configured to apply different hash functions to each of the plurality of logic circuit groups.

14. An operation method of a system on chip comprising:
identifying an address region corresponding to addresses output from a logic circuit from among a plurality of address regions;
selecting a hash function corresponding to the address region from among a plurality of hash functions;
applying the hash function to the addresses to obtain hashed addresses; and
connecting the logic circuit to at least one of a plurality of memory controllers using an access method that corresponds to the hashed addresses.

15. The operation method of claim 14, further comprising identifying the access method based on the address region and whether an interleaving access method is supported.

16. The operation method of claim 14, wherein the access method is selected from among a plurality of access methods that respectively correspond to the plurality of address regions and are different from each other.

17. The operation method of claim 14, further comprising controlling a power state of at least one memory controller that is not accessed in the access method among the plurality of memory controllers.

18. A system on chip comprising:
a plurality of memory controllers respectively connected to a plurality of memory devices;
a plurality of bus connection interfaces respectively connected to the plurality of memory controllers; and
a first logic circuit configured to select any one of a plurality of first hash functions based on a first address region corresponding to first addresses, apply the selected first hash function to the first addresses to obtain hashed first addresses, and connect to at least one of the plurality of bus connection interfaces using a first access method corresponding to the hashed first addresses.

19. The system on chip of claim 18, further comprising a second logic circuit configured to select any one of at least one second hash function based on a second address region corresponding to second addresses, apply the selected second hash function to the second addresses to obtain hashed second addresses, and connect to at least one of the plurality of bus connection interfaces using a second access method corresponding to the hashed second addresses.

20. The system on chip of claim 19, wherein one of the at least one second hash function corresponds to one of the plurality of first hash functions.

* * * * *